United States Patent [19]

Troletti

[11] Patent Number: 4,672,482

[45] Date of Patent: Jun. 9, 1987

[54] DIGITAL APPARATUS FOR MAGNETIC MEDIA DATA RECOVERY SYSTEM

[75] Inventor: Bonifacio Troletti, Boario Terme, Italy

[73] Assignee: Honeywell Information Systems Italia, Caluso, Italy

[21] Appl. No.: 659,112

[22] Filed: Oct. 9, 1984

[30] Foreign Application Priority Data

Oct. 25, 1983 [IT] Italy ............................ 23411 A/83

[51] Int. Cl.$^4$ .............................................. G11B 5/09
[52] U.S. Cl. ......................................... 360/45; 360/51
[58] Field of Search ..................... 375/101; 360/45, 51

[56] References Cited

U.S. PATENT DOCUMENTS 4,547,890 10/1985 Gindi ...................................... 360/45

Primary Examiner—Vincent P. Canney
Attorney, Agent, or Firm—Faith F. Driscoll; John S. Solakian

[57] ABSTRACT

A digital apparatus recovers data recorded in FM or MFM on a magnetic media moving at a normal speed in which the reading of the media provides a sequence of timing/data pulses at variable intervals, which differ from a nominal interval due to speed error and magnetic "peak-shift". The apparatus provides identification of a nominal interval between read out pulses and the reconstruction of a correct stream of pulses properly located within a window signal. It includes a digital measurement unit which at each read out pulse n received in input supplies at an output a code indicative of the actual duration of the interval N between the pulse n and a previous pulse n-1; and a speed correction unit which corrects the measured duration of the interval N relative to speed error detected by the digital measurement unit during reading of a synchronization bit field. A peak shift correction unit included within the apparatus utilizing the corrected interval duration, and for MFM recording, the previous most recent history of received pulses establishes a nominal duration for the interval N. The nominal duration attributed to interval N is used by a regeneration unit to produce a suitable window signal and a regenerated pulse corresponding to the read out n pulse which is properly located within the window signal.

4 Claims, 12 Drawing Figures

DIGITAL APPARATUS FOR MAGNETIC MEDIA DATA RECOVERY SYSTEM

BACKGROUND OF THE INVENTION

1. Field of Use

The present invention relates to a digital apparatus for the recovery of binary information recorded on magnetic media, such as disks, diskettes and tapes.

2. Prior Art

Among the methods of recording binary information on magnetic media, the most used is frequency modulation (FM) also known as single density and modified frequency modulation (MFM) or double density. Successively read out binary 1 and 0 bits recorded in FM are identified by the presence or absence, respectively, of a pulse in the center of contiguous recorded cells.

Each cell is defined by two timing pulses. The first one defines the beginning of the cell and the second one defines the beginning of the subsequent cell.

The time interval of a cell varies according to the media used. For instance, in the case of an 8 inch diskette and FM recording, the cell has a nominal length of 4 microseconds. Therefore, the nominal time intervals between two subsequent pulses may be 2 microseconds or 4 microseconds.

In case of MFM according successively read out binary 1 or 0 bits are also identified by the presence or absence respectively of a pulse in the center of contiguous cells.

However, MFM recording differs from FM recording in that the timing pulse, defining the beginning of a cell, is absent when a pulse representative of a binary 1 information is present in the center of such cell or in the preceding one.

For MFM also, the time interval of the cell depends on the recording media. For instance, in the case of an 8 inch diskette and MFM recording, the nominal length of the cell is 2 microseconds. Therefore, the nominal interval time between two subsequent pulses can be 2, 3 or 4 microseconds. Further, information on FM and MFM recording methods can be found in the IBM document GA 21-9257-1 entitled "IBM Two Side Diskette Original Equipment Manufacturers Information—Second Edition", dated November, 1977.

The pulse sequence read out from the magnetic medium support is applied to an input of a recovery system which supplies to an output, the binary information related to the input pulse sequence. Such pulse sequence periodically includes a so-called synchronization field (generally of 6 or 12 bytes), containing a predetermined number of pulses corresponding to a plurality of contiguous cells in which all "1" information bits or all "0" information bits have been recorded.

The synchronization field is used by the recovery system for locking in and for establishing if a pulse detected in the input is a timing pulse or a pulse representative of a recorded information bit. The recovery system is therefore able to correctly detect information recorded on the magnetic medium on the basis of the time interval between two subsequent pulses and the nature of such pulses.

Unfortunately, data recovery through only measurement of the time interval between subsequent pulses is not reliable, since such interval may present a substantial deviation from its nominal value resulting in the misinterpretation of the pulse sequence during the recovery phase.

Such deviations result from two main causes. The first is due to speed changes in the magnetic media, that is, in the rotational speed tolerances of the motor which drives the magnetic media. The second is due to the so-called phenomenon of peak-shift of the recorded pulse. As is well known in the art, such shift is primarily due to the mutual influence of adjacent pulses.

As shown, such shift can be considered zero only when the recorded pulse density is constant, that is, if the interval between subsequent pulses is always equal.

Clearly, such situation does not exist in FM and MFM recording except for the synchronization field. Therefore, the recovery system needs apparatus to correct for the causes of such errors. The most known of these apparatus are those which make use of phase lock circuits. These circuits receive the pulse sequence as an input and they supply, as an output, a so-called square wave window signal which is continuously synchronized with the input pulses. In other words, the window signal is modified in order to maintain a preestablised phase relationship with the input pulses.

The window signal and the pulse sequence are then applied to a logical network of the recovery system and suitably decoded. The read out pulse occurring when the window signal is at a first electrical level is interpreted as an information bit. A read out pulse occurring when the window signal is at a second electrical level is interpreted as a timing pulse.

The phase lock circuits generally comprise a phase comparator which receives as an input, the pulse sequence and the window signal and supplies as an output, a signal proportional to their difference in phase. Such signal is applied, through suitable filters, to a voltage controlled oscillator (VCO) which generates the window signal. These circuits, besides frequent and expensive trimming, are often affected by stability problems.

Digital phase lock apparatuses have been recently suggested to overcome such diadvantages. For instance, U.S. Pat. No. 4,357,707 discloses digital phase lock apparatus to be used together with a diskette digital controller for recovering information recorded both in FM and in MFM. According to such patent, the nominal interval between two window signal transitions is given by the sum of a variable number of periods of a fixed frequency timing signal. The circuit counts the number of timing signal periods occurring between the last window signal transition and the instant at which the next following read out pulse is received. Based on such information, it changes the position of the subsequent window signal transition, in order that the read out pulse is centered between the two window signal transitions.

In case of MFM recording, the patented apparatus varies the length of the interval between two window signal transitions upon the reception of a nth pulse, not only taking into account the interval between the last transition of the window signal and such nth pulse, but also the interval between the $(n-1)^{th}$ pulse and the window signal transition immediately preceding such $(n-1)^{th}$ pulse.

In this way, the patented apparatus tries to recover from the error caused by the "peak shift" phenomenon which especially affects the MFM recording. Additionally, the apparatus in U.S. Pat. No. 4,357,707 attempts to recover from the error caused by the magnetic media speed variation. It continuously verifies whether each pulse of a plurality of pulses received as an input is early or late relative to its nominal position. Accordingly, it increments or decrements a counter and modifies the number of timing periods defining the nominal interval between two window signal transitions as a function of the status of such counter.

Besides requiring the use of high performance components, intrinsically expensive (such as control memory with minimum access time), the patented apparatus is affected by several limitations in the recovery of MFM recorded binary information. In fact, even though the recovery of the errors due to speed changes and to the "peak shift" phenomenon is carried out by independent circuits, such circuits are responsive to a pulse train in which these errors are both present and add to each other. It is therefore clear that recovery from the error due to the speed variation is affected by the "peak shift" phenomenon as well as the recovery from the error due to the "peak shift" phenomenon is affected by the magnetic media speed error.

Therefore, a correct phase relation between window signal and the read out pulse train can not be assured. Additionally, presuming a correct recovery of the error due to speed variation, the circuit disclosed in U.S. Pat. No. 4,357,707 is able to recover from errors due to the peak shift phenomenon whose maximum value is often less than that which may actually occur. As concerns the peak shift recovery, it must be added that the patented circuit tends to propagate the indeterminate error or measurement uncertainty which affects the measurement of the interval between a pulse and the previous window signal transition onto the subsequent intervals. The digital apparatus of the present invention overcomes such disadvantages.

SUMMARY OF THE INVENTION

According to a first aspect of the invention, the apparatus of the embodiment first measures the time interval between the last and the next to last read out pulse. From such measurement, it recovers from the error due to the speed variaion and to the peak shift phenomenon. Finally, it generates the window signal and produces a last read out pulse in correct phase relationship with the window signal.

According to a further aspect of the invention, the digital phase lock apparatus recovers from the error due to the rotational speed variation and to the peak shift phenomenon during two separated phases avoiding the recovery of the error due to the speed variation from being affected by the error due to the peak shift phenomenon. During the recovery phase from the error due to the speed variation, a quantity representative of the rotational speed error is added to or deducted from the measured duration of the last detected interval. Such quantity is not fixed but is updated each time the apparatus detects that a suitable number of subsequent pulses had a constant recording density and therefore such quantity is not affected by peak shift error.

Subsequent to the recovery from the error due to the speed variations, the apparatus of the present invention analyzes the measured duration of the last interval and, according to such measurement, determines the nominal length to be associated with the last interval. In the case of recovery of MFM recorded data, the apparatus determines the nominal length to be associated with the last interval by also taking into account the measured duration of the next to last interval, the nominal duration associated with the next to the last interval and the nominal duration associated with the third to the last interval.

The recovery of the error due to the peak shift phenomenon as effected avoids the indeterminate error present in the length measurement of an interval from propagating and affecting the determination of the nominal length to be associated with the subsequent intervals. Further, it allows the recovery of peak shift errors within a wide range of possible values.

BRIEF DESCRIPTION OF THE DRAWINGS

FIGS. 8, 9 and 10 show, with reference to the recovery of MFM recorded information, the mapping of a memory included in the peak shift compensation unit of FIG. 7.

DESCRIPTION OF THE PREFERRED EMBODIMENT

Figure 1:
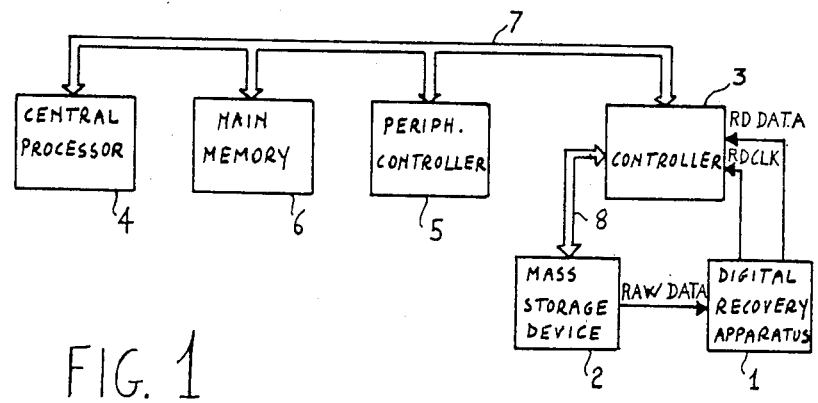
FIG. 1 shows a block diagram a typical data processing system comprising the digital apparatus of the present invention.

FIG. 1 shows in block diagram, a typical data processing system comprising the digital apparatus of the present invention. Such apparatus, indicated by reference number 1, is positioned between a mass storage drive device 2 and a controller 3.

The system of FIG. 1 further comprises a central processor 4, a peripheral controller 5 and a main memory 6. Central processor 4, memory 6 and controllers 3, 5 are connected in common by means of a plurality of leads or system bus 7 through which data, addresses and control signals can be exchanged. In the present embodiment, the system mass storage is provided by an 8 inch diskette. The considerations made in the following will be, however, valid for other kinds of storage devices too, as for instance, magnetic tape storage. In the present embodiment, where the mass storage is provided by a diskette, a standard integrated circuit chip, such as the 1791 integrated circuit chip, manufactured by Western Digital Corporation, can be used as controller 3.

Controller 3 and drive device 2 exchange a plurality of control and information signals through a channel or bus 8. Detailed descriptions of the circuits and interface signals between controller 3 and device 2 as well as between controller 3 and apparatus 1 have been omitted, since it is not essential for an understanding of the present invention. It is required only that the recovery apparatus 1 must supply the controller 3 with a square wave window signal RDCLK and with a pulse train RD DATA at logical level 0, each pulse corresponding to a magnetic flux transition detected on recording media. Pulses RD DATA and the window signal RD CLK have only to fulfill the condition that each pulse RD DATA occur entirely within a half wave (or window) of signal RD CLK. For the rest, the pulse position relative to window signal RD CLK and the pulse length can be arbitrary. However, it is preferred that the length of a pulse RD DATA fall in the range of 100 to 250 nanoseconds, and the delay of the beginning or end of a pulse relative to the transition of window signal RD CLK should be no longer than 40 nanoseconds.

Controller 3 does not need to be informed of whether each of the pulses RD DATA corresponds to a timing transition or to a data transition. The controller is able to distinguish between such transitions from the pattern read out in response to the well known synchronization and "address mark" fields. Also, the period of the timing or window signal can be variable and each of the two signal half waves may have a different length.

Device 2 supplies digital apparatus 1 with a pulse RAW DATA in response to each detected magnetic flux transition. Since the disclosed system is intended to recover FM and MFM recorded information, the time intervals between subsequent pulses RAW DATA are indicative of such information. Apparatus 1, in response to the pulse train RAW DATA received as an input, supplies controller 3 with the window signal RD CLK and with the pulses RD DATA which correspond to the pulses RAW DATA suitably positioned relative to window signal RD CLK. Controller 3 is able by means of signal RD CLK to detect the information bits within the pulse train RD DATA and make them available in parallel form to system bus 7.

Figure 2:
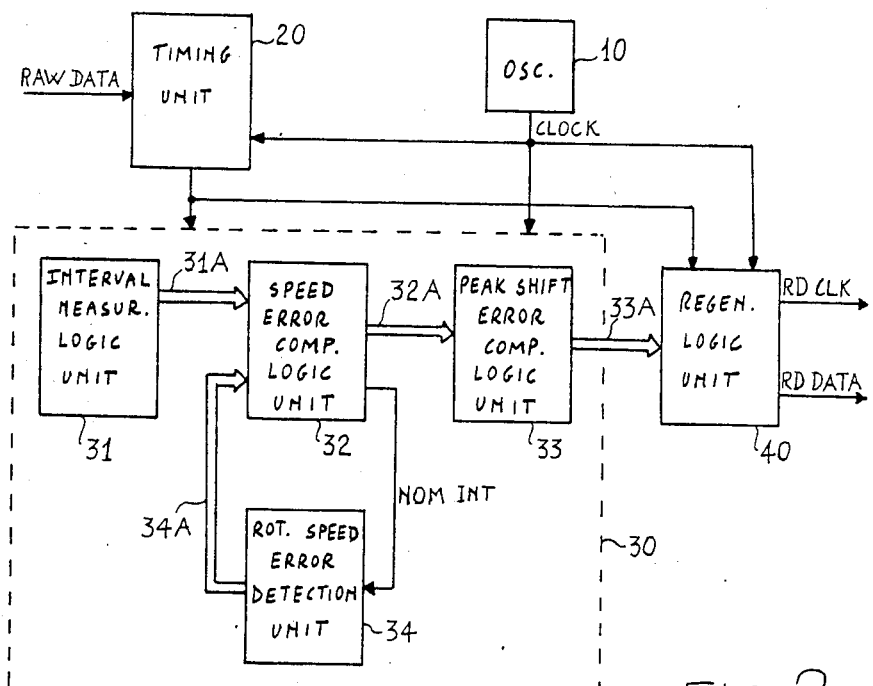
FIG. 2 shows in block diagram the digital apparatus of the present invention.

FIG. 2 shows in block diagram form, the digital apparatus 1 of FIG. 1 which corresponds to the present invention. Apparatus 1 essentially comprises an oscillator 10, a timing unit 20, a logical unit 30 for measuring the interval duration between subsequent input pulses and recovery from possible errors present in such interval duration due to the speed variations and to the peak shift phenomenon and a logical unit 40 for reconstructing the read pulse train RD DATA and for generating window signal RD CLK. Oscillator 10 supplies units 20, 30 and 40 with a square wave signal CLOCK having a frequency of 16 MHz. Timing unit 20 is activated by each of the pulses RAW DATA and supplies one or more timing signals to units 30 and 40 to control and synchronize their operation.

FIG. 2 shows that unit 30 includes a logical unit 31 for measuring of the interval duration, a logical unit 32 for compensating for the error due to speed variation, a logical unit 33 for compensating for the error due to the "peak shift" phenomenon and a logical unit 34 for determining the variation in rotational speed. Unit 31, in response to the rising or positive going edge of pulse RAW DATA supplies, an output channel 31A, a first information signal indicative of the duration of the interval between such rising edge and one of the preceding RAW DATA pulses. Such first information signal is clearly affected by errors due to the speed variation and to the "peak-shift" phenomenon.

Compensation unit 32 adds or substracts from the first information signal on channel 31A, a second information signal available on output channel 34A of unit 34 which is indicative of the speed error. On output channel 32A of logical compensation unit 32, a third information signal is thus present, indicative of the duration of the last interval where recovery from the error due to the speed variation has occurred. On a further output of unit 32, a control signal NOM INT is also available indicating when at a first logical level, that the binary information signal output of unit 31 is representative of an interval whose duration differs from a prefixed nominal duration, for instance, 2 microseconds in MFM or 4 microseconds in FM. That is, it is no more than a prefixed value.

Unit 34 receives signal NOM INT and when such signal is active for a certain number of subsequent intervals, the unit 34 updates the information indicative of the detected error speed and makes it available on output channel 34A.

The information signal at the output of unit 32, indicative of the duration of the last interval (the duration being only affected by the "peak shift" error), is sent to compensation unit 33.

In case of FM recording, unit 33 determines from such information signal the nominal duration of the last interval and supplies logical unit 40 through channel 33A with a digital information signal specifying whether or not signals RD CLK and RD DATA to be generated are related to an interval of nominal duration of 2 or 4 microseconds.

In case of MFM, recording unit 33 determines the normal duration of the last interval from the information signal at the output of unit 32 and from the previously received information, indicative of the duration of the next to last interval, the nominal duration associated with the next to last interval and the nominal duration associated to the second to the last interval. The nominal duration of the last interval, which may be 2, 3 or 4 microseconds, is supplied to logical unit 40 through channel 33A.

Unit 40 generates the RD CLK window and RD DATA signals in accordance with such nominal duration. Since unit 40 could receive from unit 33, information signals indicative of the last interval while the generation of signals RD CLK and RD DATA related to the previous interval is still in process, it is provided with means for avoiding such loss of information. This will be made clearer from the detailed description of unit 40 which follows.

Figure 3:
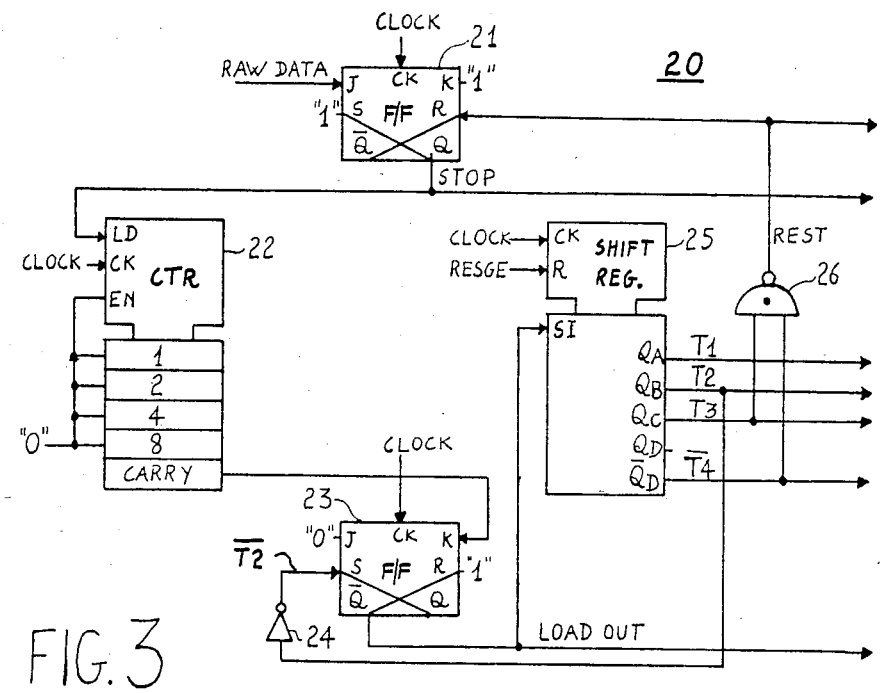
FIGS. 3, 4 and 5 show in detail the timing unit, the measuring unit, and the speed error detection unit, respectively, of the digital apparatus of FIG. 2.

FIG. 3 shows in detail, logical timing unit 20. It comprises two J,K flip-flops 21, 23, a 4-bit counter 22, a 4-bit shift register 25, a 2-input NAND gate 26 and a NOT gate or inverter 24. In FIG. 3, as well as in the subsequent figures, only the circuit inputs required for an understanding of the invention are shown. At the end of the present description, a list of the circuits used is given. From the specifications of these circuits and from the operations, they are designed to perform within the apparatus of the invention, a person skilled in the art can easily determine the logical levels to be applied to the circuit inputs, not shown in the figures. FIG. 6 shows a timing diagram of the signals present at some points of the circuits of FIGS. 3, 4 and 5 to facilitate understanding their operation.

In order to simplify the following description, the essential characteristics of some logical elements shown in the figures are given. All J, K flip-flops shown herein are of the type triggered on the positive edge of a signal applied to clock input CK. Such edge sets them or keeps them set when the logical levels on their inputs J, K are 1, 1 respectively. They are reset/kept reset when the logical level on inputs J, K is 1, 0 respectively. They do not toggle when the logical levels on inputs J, K are 0, 1 respectively. The set and reset inputs (S, R) each must be at logical 1 levels. These flip-flops are set and reset asynchronously when a logical level 0 is applied to set (S) input and reset (R) input, respectively.

The 4-bit counters are of the type triggered on the positive edge of a signal applied to clock input CK and are provided with a load input LD, an enable input EN and data inputs. When a logical 1 level is applied to input LD, the counter is incremented by one by each timing pulse when the logical level is input EN is a 0. When input EN is a 1, the counter does not increment. When a logical 0 level is applied to input LD, the information present on the data inputs is loaded into the counter, independently of the logical level on input EN. The counters have a CARRY output which normally is at logical 1 level. It falls to 0 when the counter stores the maximum count (i.e., 15).

Referring again to FIG. 3, flip-flop 21 receives the 16 MHz frequency signal CLOCK at the clock input CK, the asynchronous signal RAW DATA at the J input and the signal REST at the reset input. The signals CLOCK, RAW DATA, and RESET are shown in FIG. 6.

Set input S and K input of flip-flop 21 receives a signal which is permanently held at logical 1 level. A signal STOP on output Q of flip-flop 21 rises to a logical 1 level on the rising edge of signal CLOCK when the signal RAW DATA is at a logical 1 level. Signal STOP falls to a logical 0 level when signal REST falls to a logical 0 level. Signal STOP is sent to unit 30 of FIG. 2.

Signal STOP is further applied to load input LD of counter 22 which receives signal CLOCK on its clock input CK. A signal at logical 0 level is permanently applied to enable input EN and to the data inputs of counter 22. Therefore, the counter is normally at rest when it stores a count of 0. When signal STOP rises to a logical 1 level, counter 22 increments its count by one in response to each rising edge of signal CLOCK. The CARRY output of counter 22 falls to logical level 0 after a time period which corresponds to the reception of 15 CLOCK pulses. The CARRY output is connected to the K input of flip-flop 23.

Flip-flop 23 receives the CLOCK signal at its clock input CK and a signal $\overline{T2}$ at the set inputs. Signal $\overline{T2}$ is obtained by inverting a signal T2 through NOT gate 24. Signals at logical 1 and 0 levels are respectively applied to the reset input R and to the J input of flip-flop 23.

Flip-flop 23 delivers a signal LOAD OUT on its inverted output $\overline{Q}$. Signal LOAD OUT rises from a logical 0 level to a logical 1 level on the rising edge of the CLOCK pulse subsequent to the pulse which switched the output CARRY signal of counter 22 to a logical 0 level. Signal LOAD OUT falls again to a logical 0 level when $\overline{T2}$ falls to a logical 0 level. Signal LOAD OUT is sent to units 30 and 40 of FIG. 2.

Signal LOAD OUT is also applied to the serial input (SI) of shift register 25 which receives the CLOCK signal on its timing input CK and a signal RESGE on its reset input R. Signal RESGE falls to a logical 0 level only during the initializing reset phase of the apparatus. The logical 1 level of signal LOAD OUT is transferred to output QA of shift register 25 on the rising edge of the CLOCK pulse signal subsequent to the pulse which switched signal LOAD OUT to a logical 1 level. On successive CLOCK pulses, the logic 1 level is shifted to outputs QB, QC and QD of shift register 25 and to output $\overline{QD}$ in inverted form. Therefore, timing signals T1, T2, T3 and $\overline{T4}$ (waveforms T1, T2, T3 and $\overline{T4}$ of FIG. 6) are present on such outputs. Such timing signals are sent to unit 30 of FIG. 2.

Also, signal T2 resets flip-flip 23 through NOT 24, while signals T3 and $\overline{T4}$ are applied to the inputs of NAND gate 26. A signal REST, present on the output of such NAND gate 26, resets flip-flop 21 among other things. From FIGS. 3 and 6, it can be seen that when the CLOCK signal frequency is equal to 16 MHz (i.e., the signal period is equal to 62.5 nanoseconds), LOAD OUT signal rises to a logical 1 level after a delay equal to $16 \times 62.5 = 1000$ nanoseconds at the instant when signal STOP, indicative of the arrival of a pulse RAW DATA, rises to a logical 1 level.

In short, timing unit 20 is activated upon the reception of a read out pulse RAW DATA in synchronism with the next occurring CLOCK pulse, and it supplies suitable timing signals STOP, LOAD OUT, T1, ... $\overline{T4}$ and REST which are preestablished duration multiples of the CLOCK period.

Figure 4:
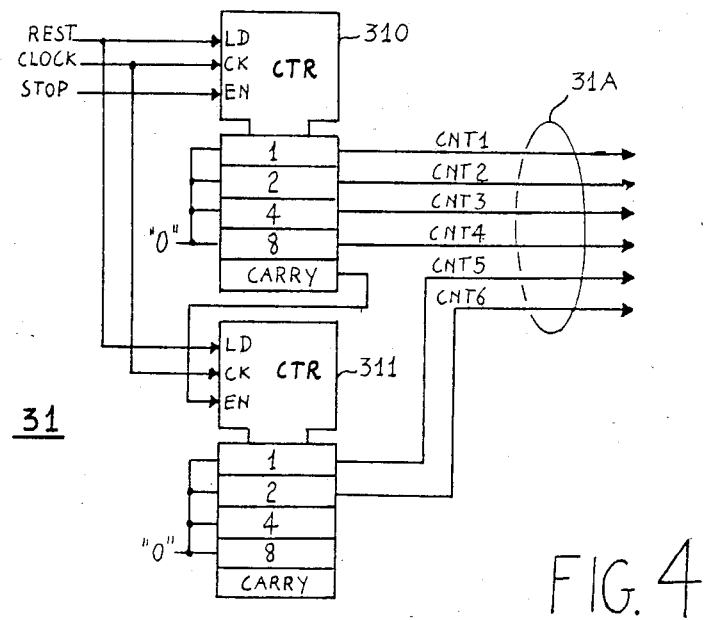

FIG. 4 shows in detail, the measurement unit 31 of FIG. 2. It substantially consists of two, 4-bit counters 310 and 311 suitably connected in cascade in order to constitute an 8-bit counter where the 4 bits supplied by counter 311 are the most significant ones. Signals CLOCK and REST are received by the timing input CK and by the load input LD of both counters 310 and 311. Counter 310 enable input EN receives signal STOP while the enable input EN of counter 311 is connected to the CARRY output of counter 310. Each of the data inputs of counters 310 and 311 receives a signal permanently fixed at a logical 0 level so that it is reset when loaded (i.e., the rising edge of CLOCK signal when input LD is at a logical 0 level). The two most significant outputs of counter 311 are not used.

Examining FIGS. 4 and 6, it can be noted that each of the counters 310 and 311 is reset by the rising edge of signal CLOCK when REST signal is at a logical 0 level (i.e., after a delay of $20 \times 62.5 = 1250$ nanoseconds when signal STOP, indicative of a RAW DATA pulse reception, switches to a logical 1 level). Thereafter, the counter is incremented by one at each CLOCK rising edge until signal STOP, already fallen to a logical 0 level agains rises to a logical 1 level signifying reception of a new RAW DATA pulse. At this point, counters 310 and 311 stop.

It is therefore clear that signals CNT1 ... CNT6, at the outputs of counters 310 and 311, indicate in binary code in multiples of 62.5 nanoseconds, the duration of the time interval measured between the last and the next to last RAW DATA pulse received, less 1250 nanoseconds. Thus, for instance, the binary code corresponding to decimal number N (with $0 \leq N \leq 63$) at the outputs of counters 310 and 311 means a time interval measured between two subsequent RAW DATA pulses equal to $1250 + N \cdot 62.5$ nanoseconds. Such information is available during the whole time in which timing signals STOP stays at a logical 1 level and for the immediately subsequent CLOCK period.

Figure 5:
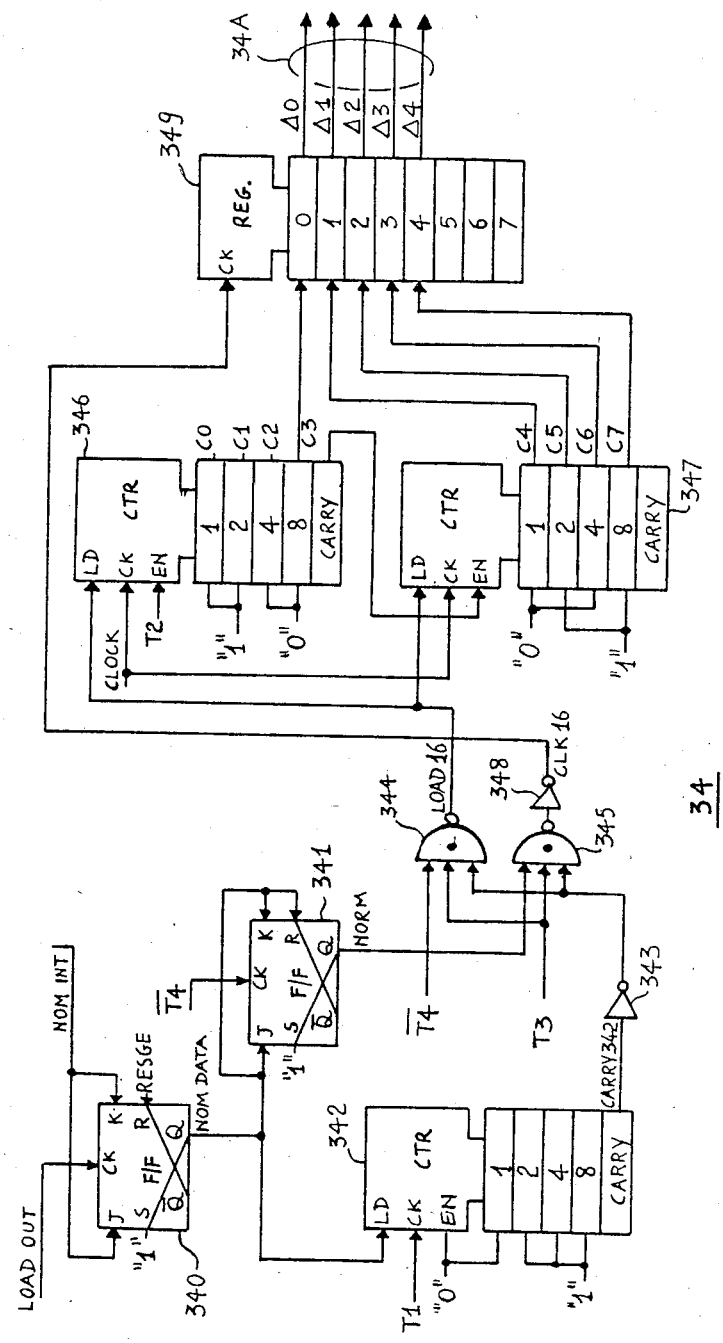
Figure 6:
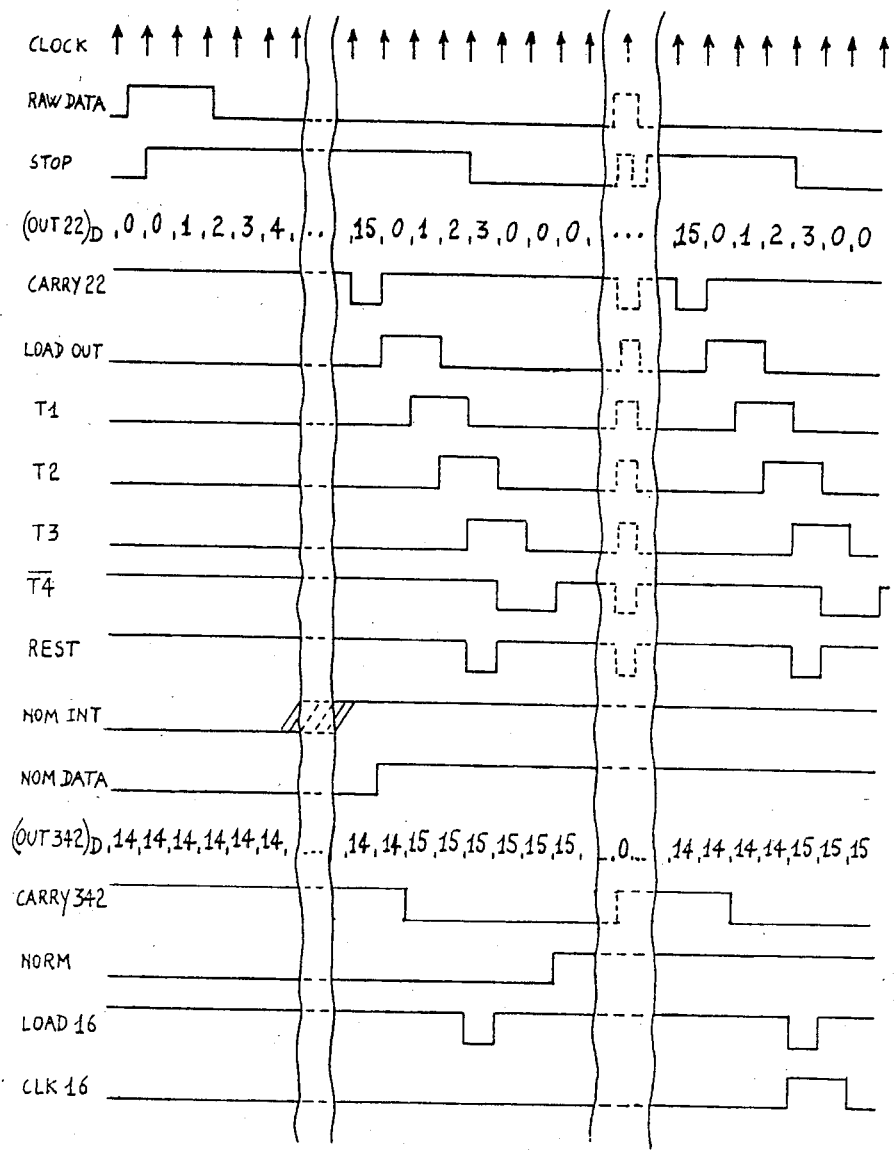
FIG. 6 shows a timing diagram of the signals present in some points of the circuits of FIGS. 3, 4 and 5.

FIG. 5 shows in detail, logical unit 34 which detects the variation in speed (i.e., the speed error) from the nominal speed. It consists of two JK flip-flops 340 and 341, three 4-bit counters 342, 346 and 347, a register 349, two 3-input NAND gates 344 and 345 and 2 NOT gates 343 and 348. Unit 34 has to operate only during the reading of preestablished fields recorded on the magnetic media, where the pulses are only affected by speed errors and not "peak shift" errors. In the following description, such fields will be named "activation field" for unit 34.

As already mentioned, the signal NOM INT rises to a logical 1 level each time the interval between two subsequent RAW DATA pulses (in the following named "interval") differs from a nominal interval of 2 microseconds in MFM and 4 microseconds in FM, for a value not greater than a preestablished value as, for instance, ±12%. When this condition is maintained for a train of 17 measured intervals, these intervals identify a unit 34 activation field. Counter 342 and flip-flops 340 and 341 constitute a network which verifies the existence of the NOM INT signal condition for 17 intervals. Counters 346 and 347 constitute a network for measuring the difference between the actual duration of 16 of such 17 intervals (i.e., the first of such 17 intervals is omitted as it is certainly affected by peak shift error) and the duration of 16 subsequent nominal intervals. The measured difference is stored in register 349 which is updated at each new difference measurement effected in accordance with an activation field.

Flip-flop 340 receives on its timing input CK, the signal LOAD OUT, on its JK inputs the signal NOM INT and on its reset input, the reset signal RESGE. A signal permanently at a logical 1 level is applied to the set input S of flip-flop 340. A signal NOM DATA, present on the Q output of flip-flop 340 rises to a logical 1 level on the rising edge of signal LOAD OUT when signal NOM INT is at a logical 1 level. The signal NOM DATA is applied to the load input LD of counter 342 which receives the signal T1 on its timing input CK and a signal permanently at logical 0 level on its enable input EN. Each of the data inputs of counter 342 receives a suitable logical 0 level or 1, in order that the counter be set at a binary value corresponding to decimal number 14 on the rising edge of T1 and with signal NOM DATA at a logical 0 level. Signal NOM DATA is further applied to the JK inputs and to the reset input of flip-flop 341. Such flip-flop receives signal $\overline{T4}$ on its timing input CK and a signal permanently at logical 1 level on its set inputs.

The operation of counter 342 and flip-flops 340 and 341 is as follows. When NOM INT is at a logical 0 level, flip-flop 340 is reset or kept in reset at the timing pulse LOAD OUT. Therefore, the logical level of signal NOM DATA at the Q output of flip-flop 34 is a logical 0 level. Correspondingly, at the reception of timing pulses T1 (one for each interval between RAW DATA pulses), counter 341 is set to the binary value equivalent to number 14 and it does not increment. The CARRY output of counter 342 stays at a logical 1 level. When signal NOM DATA is at a logical 0 level, flip-flop 341 is periodically placed in a reset status by the rising edge of pulse $\overline{T4}$ and the signal NORM at the output of such flip-flop is at a logical level 0.

On the contrary, when signal NOM DATA rises to a logical 1 level, flip-flop 340 is set by the subsequent rising edge of signal LOAD OUT and counter 342 is enabled to increment. Counter 342 is put in a status indicative of decimal value 15 by the immediately subsequent rising edge of pulse T1, and CARRY output of counter 342 falls to a logical 0 level. Immediately after flip-flop 341 is set by the rising edge of signal $\overline{T4}$, signal NORM rises to a logical 1 level. When signal NOM INT is kept at a logical 1 level for 16 additional intervals (i.e., during 16 further subsequent rising edges of signal LOAD OUT), signal NORM stays at a logical 1 level for all those further 16 intervals and counter 342 goes on incrementing upon the reception of each pulse T1.

In other words, with the second pulse T1, the counter is set to a count representative of the numerical 0 value and signal CARRY 342 rises to a logical 1 level. With the third pulse T1, the counter is set to a count representative of the numerical 1 value, etc. With the seventeenth pulse T1, the counter is set to a count representative of the numerical 15 value and signal CARRY 342 agains falls to 0.

The timing diagram of FIG. 6 shows signals NOM DATA, NORM, and CARRY 342 in the case where signal NOM INT is kept at a logical 1 level for at least 17 intervals. When this does not occur, flip-flops 340 and 341 are reset and counter 342 goes to a count corresponding to the numerical value 14. Signals CARRY 342 and NORM control the operation of counters 346 and 347 and register 349. The signal NORM is applied to a first input of NAND gate 345 which receives respectively on the other two inputs, signal T3 and the signal present on the output CARRY of counter 342 through NOT gate 343. Signal T3 and the signal present on the output of NOT gate 343 are also applied to two inputs of NAND gate 344 which receives signal $\overline{T4}$ on a third input. The output of NAND gate 344 supplies a LOAD 16 signal which falls to a logical 0 level for the duration of CLOCK period on the rising edge of signal T3, the first time after the acknowledgement of a first nominal interval (i.e., NOM INT=1) and a second time upon the detection of 17 subsequent nominal intervals.

The output of NAND gate 345 is connected to the input of NOT gate 348 which supplies a signal CLK 16 as an output. Signal CLK 16 is normally at 0 and rises to a logic 1 level for the duration of two clock periods, in response to signal T3 only after 17 subsequent nominal intervals have been detected. Signal LOAD 16 is applied to load inputs LD of 4-bit counters 346 and 347 which receive signal CLOCK on their timing inputs CK. Such counters are connected in cascade to form an 8-bit counter where the most significant 4 bits are those of counter 347. To this end, the enable input EN of counter 347 is connected to the CARRY output of counter 346. The enable input EN of counter 346 receives signal T2. Each of the data inputs of counters 346 and 347 receives a suitable level 0 or 1, in order that they may be preset at a decimal count of 163 on the rising edge of the CLOCK signal when signal LOAD 16 is at a logical 0 level. The counter content is then incremented by one on each rising edge of the CLOCK signal when signal T2 is at a logical 0 level.

Outputs C4 through C7 of counter 347 and the output C3 of counter 346 are connected to a different one of the inputs of the latching register 349 which receives signal CLK 16 on its clock input T. On the rising edge of signal CLK 16, register 349 latches and makes the information present on its inputs, available on its outputs as signals Δ0 through Δ4. In other words, the operation of counters 346 and 347 is as follows. Signal LOAD 16 falls to a logical 0 level after acknowledgement of a first interval whose actual length differs from a preestablished nominal duration by no more than a certain percent value. Signal LOAD 16 falling to 0, causes the loading of counters 346 and 347 which start to increment at each positive edge of signal CLOCK when T2 is a 0. During the CLOCK periods of each interval between RAW DATA pulses when T2 is at 1 (i.e., for the duration of 2 CLOCK periods corresponding to 125 nanoseconds), incrementation is skipped. Stopping the count of counters 346 and 347 is necessary to assure a stable configuration at such counter outputs on the rising edge of signal CLK 16. Counters 346 and 347 therefore count the CLOCK pulses contained in an interval between two RAW DATA pulses less 2 pulses, that is, 125 nanoseconds. When signal NOM INT is kept at 1 for at least 16 further intervals, the counters continue to increment. After the detection of the seventeenth subsequent interval at which signal NOM INT=1, the rising edge of signal CLK 16 causes register 349 to be loaded with the status reached by the counters. Immediately after signal LOAD 16 falls to a 0, the counters are preset to decimal count value 163 by the CLOCK signal. The information signals ($\Delta 0$ through $\Delta 4$) available on output channel 34A of unit 34 define in coded form the speed error relative to its nominal value. In fact, starting with T0, the time interval corresponding to 16 of the 17 subsequent measured intervals which correspond to a nominal duration of 2 microseconds in MFM or 4 microseconds in FM (NOM INT=1), the number of signal CLOCK periods within interval T0 change according to the speed error.

In MFM, in the case where the speed variation is +12.5% or −12.5%, the interval T0 will be equal to 16×1.750=28 microseconds or to 16×2.250=36 microseconds which corresponds respectively to 448 and 576 periods of the CLOCK signal. In FM, in the case where the speed variation is +12.5% or −11.7%, the interval T0 will be equal to 16×3.500=56 microseconds or to 16×4.468=71.48 microseconds corresponding respectively to 896 and 1144 periods of the CLOCK signal. Considering that signal T2 masks 2 rising edges of signal CLOCK and assuming an allowable speed variation ranging from +12.5% to −12.5% in MFM and from +12.5% to −11.7% in FM, the minimum and maximum number of signal CLOCK periods that counters 346 and 347 may count are 448−(16×2)=416 and 576−(16×2)=544 in MFM, 896−(16×2)=864 and 1144−(16×2)=1112 in FM, respectively.

In MFM, the actual limit of decimal values present on the outputs of counters 346 and 347 will be 67 for a speed variation of +12.5% and 195 for a speed variation of −12.5% as such counters overflow 2 times during interval T0 due to being preset to the value 163. On the contrary, the actual limit of the decimal value present on the outputs of counters 346 and 347 will be 3 for a speed variation of +12.5% and 251 for a speed variation of −11.7% as such counters overflow 4 times during interval T0 due to being preset to the value 163.

In the case of the recovery of MFM or FM recorded information, tables I and II, respectively, give correspondence between some of the decimal values indicated by signals $\Delta 0$ through $\Delta 4$ (where $\Delta 4$ is the most significant bit), the corresponding decimal values related to the information present on outputs C0 through C7 (where C7 is the most significant bit) of counters 346 and 347 and the actual number M of signal CLOCK periods detected within the interval T0 by counters 346 and 347.

In the fourth column of tables I and II, E indicates (with an approximation of ¼ of the CLOCK period) the average duration error of an interval expressed in CLOCK periods by bits $\Delta 0$ through $\Delta 4$ relative to a nominal interval having a length of 2000 nanoseconds in MFM and 4000 nanoseconds in FM. The fifth column of tables I and II indicates the percent error in $\Delta V\%$ which is related to each value ($\Delta 0$ through $\Delta 4$)$_D$.

TABLE I

| $(\Delta 0-\Delta 4)_D$ | $(C0-C7)_D$ | M | E | $\Delta V \%$ |
|---|---|---|---|---|
| 0 + 7 | ≦63 | ≦412 | <−4 | >+12.5 |
| 8 | 64–71 | 413–420 | −4 | +12.5 |
| 9 | 72–79 | 421–428 | −4.5 | +10.93 |
| : | : | : | : | : |
| 15 | 120–127 | 469–476 | −0.5 | +1.56 |
| 16 | 128–135 | 477–484 | 0 | 0 |
| : | : | : | : | : |

TABLE I-continued

| $(\Delta 0-\Delta 4)_D$ | $(C0-C7)_D$ | M | E | $\Delta V \%$ |
|---|---|---|---|---|
| 20 | 160–167 | 509–516 | +2 | −6.25 |
| 21 | 168–175 | 517–524 | +2.5 | −7.81 |
| : | : | : | : | : |
| 24 | 192–199 | 541–548 | +4 | −12.5 |
| 25 + 31 | ≧200 | ≧549 | >+4 | <−12.5 |

TABLE II

| $(\Delta 0-\Delta 4)_D$ | $(C0-C7)_D$ | M | E | $\Delta V \%$ |
|---|---|---|---|---|
| 0 | 0–7 | 861–868 | −8 | +12.5 |
| 1 | 8–15 | 869–876 | −7.5 | +11.7 |
| 2 | 16–23 | 877–884 | −7 | +10.93 |
| : | : | : | : | : |
| 10 | 80–87 | 941–948 | −3 | +4.68 |
| : | : | : | : | : |
| 16 | 128–135 | 989–996 | 0 | 0 |
| 17 | 136–143 | 997–1004 | +0.5 | −0.78 |
| : | : | : | : | : |
| 25 | 200–207 | 1061–1068 | +4.5 | −7.03 |
| : | : | : | : | : |
| 30 | 240–247 | 1101–1108 | +7 | −10.93 |
| 31 | 248–255 | 1109–1116 | +7.5 | −11.7 |

As already indicated, the timing diagram of FIG. 6 shows some of the signals mentioned in the description of FIGS. 3, 4 and 5. Further, in FIG. 6, signals CARRY 22 and CARRY 342 are indicative of the signals present on CARRY output counters 22 and 342, respectively, while signals (OUT 22)$_D$ and (OUT 342)$_D$ are indicative of the decimal value at each CLOCK signal period related to the count of counter 22 of FIG. 3 and counter 342 of FIG. 5, respectively.

Figure 7:
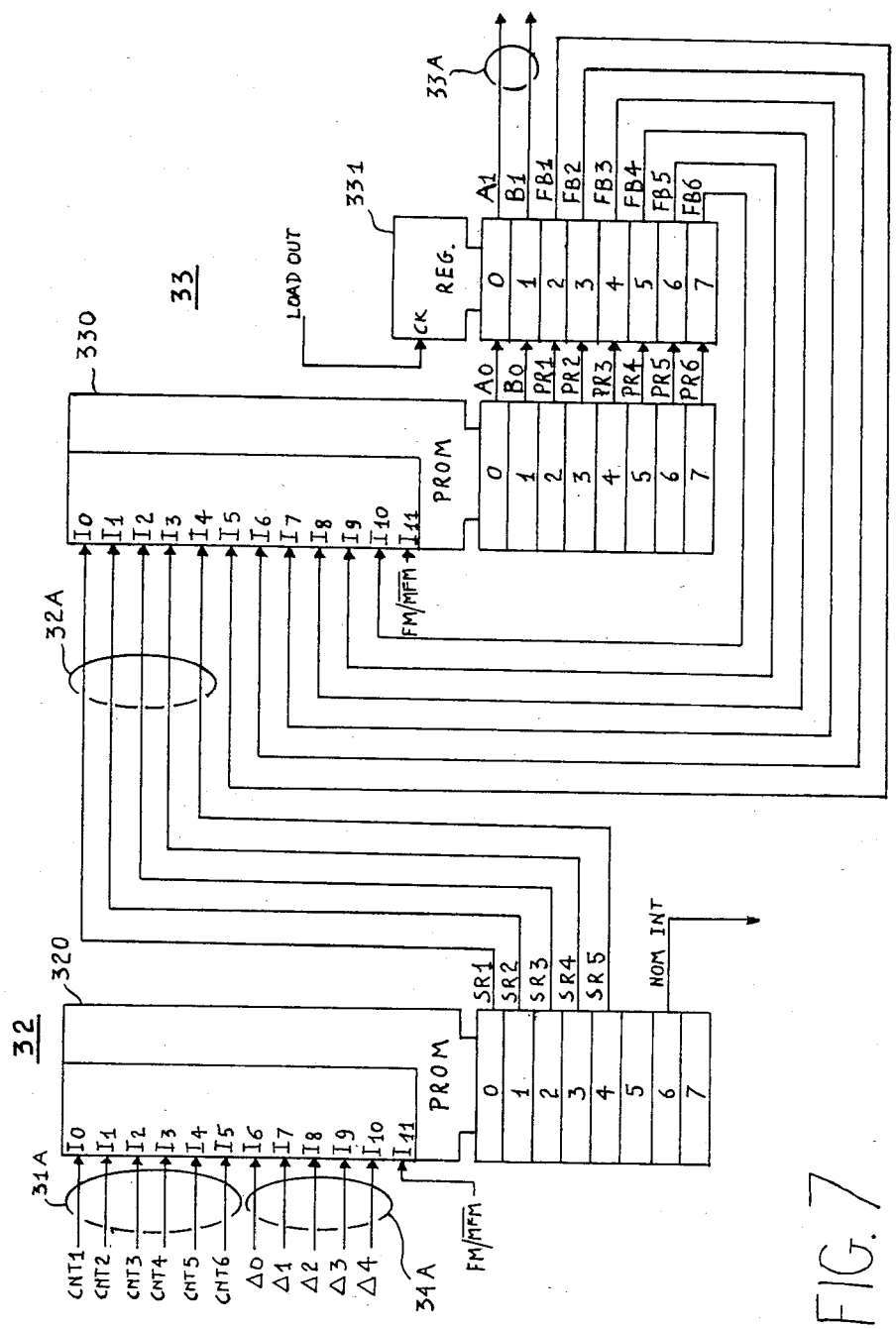
FIG. 7 shows in detail, the speed and peak shift error compensation units of the apparatus of FIG. 2.

FIG. 7 shows in detail, compensation units 32 and 33 of FIG. 2. Compensation unit 32 consists of programmable read only memory 320 having a 4K byte capacity, while compensation unit 33 consists of programmable read only memory 330 having a 4K byte capacity and an 8-bit latching register 331. Memory 320 receives signals CNT1 through CNT6 on its least significant address inputs IO through 15 via channel 31A, and signals $\Delta 0$ through $\Delta 4$ on its most significant address inputs I6 through I10 via channel 34A. Memory 320 receives on its most significant address input I11 a signal FM/$\overline{MFM}$ set at logical level 1(0) in the case of the recovery of information recorded in FM ($\overline{MFM}$). In both FM and MFM, each possible pair of codes CNT1-CNT6 and $\Delta 0$-$\Delta 4$, indicative of a measured interval duration (i.e., CNT1-CNT6) and of a previously detected current speed error which is still in force (i.e., $\Delta 0$-$\Delta 4$), addresses a memory location wherein a 5-bit binary code is stored which is indicative of the measured interval duration (CNT1-CNT6) corrected according to the current speed error. Such code is available at outputs SR1-SR5 of memory 320.

In each memory location, a bit is further recorded indicating whether code CNT1-CNT6 stands for an interval duration which differs from the nominal interval duration of 2 microseconds in FM or 4 microseconds in MFM by a value not higher than a certain percent value (±12.5 in MFM and −11.7% ++12.5% in FM). Such a bit is available at a further output of memory 320 which supplies signal NOM INT to speed error detecting unit 34. For each measured interval (CNT1-CNT6), memory 320 is steadily addressed on the rising edge of signal STOP for the whole time that such signal remains at a logical 1 level. Signal LOAD OUT, which sets/resets flip-flop 340 according to the logical level of signal NOM INT, is generated after a delay of 1000 nanoseconds relative to the rising edge of signal STOP.

Therefore, any kind of programmable memory, even slow, which has an address selection and read out time lower than 1000 nanoseconds, could be used as memory 320 to assure the stable generation of signal NOM INT before signal LOAD OUT. Since some of the outputs of memory 320 whose read out data are strobed by signal LOAD OUT address in memory 330 in cascade, the sum of the read out and address selection times of both the memories must be lower than 1000 nanoseconds. Each of the possible 32 codes present at outputs SR1-SR5 is preferably indicative of interval durations corrected for speed error and variable from 2000 nanoseconds to 3937.5 nanoseconds in increments of 62.5 nanoseconds. In fact, the peak shift phenomenon, absent speed errors, causes an increase in interval duration relative to corresponding nominal intervals of 2 microseconds and a reduction in the intervals relative to corresponding nominal intervals of 4 microseconds. The defined range of values is therefore adequate.

The programming of memory 320 is obvious. Each possible code CNT1-CNT6 is indicative of a measured interval duration. Such duration must be reduced or increased by a percentage according to the speed percent error indicated by code Δ0-Δ4. The corrected duration is indicated by its representative code and is written into the memory location addressed by the corresponding codes CNT1-CNT6 and Δ0-Δ4 and by bit FM/$\overline{\text{MFM}}$.

Referring again to FIG. 7, outputs SR1-SR5 of memory 320 are connected through channel 32A to address inputs I0-I4 of memory 330 and supplies them each time with a code indicative of the actual duration (corrected as to speed) of the measured interval. Such code is indicated by $DE_N$ and marked with order number N. Memory 330 further receives signal FM/$\overline{\text{MFM}}$ on its most significant input I11.

The recovery that memory 330 has to perform is establishing the nominal duration to be associated to code $DE_N$ bearing in mind that the duration indicated by $DE_N$ is affected by the peak shift phenomenon. Memory 330 also receives on its inputs I5, ... I10, some signals which will be considered later herein. When memory 330 is addressed by code $DE_N$ (and by the other information), it generates on outputs A0 and B0, a binary code $DN_N$ indicative of the nominal duration to be associated to the actual duration signified by code $DE_N$.

In MFM, when A0 and B0=01, 10 and 00, nominal durations of 2 microseconds, 3 microseconds and 4 microseconds, respectively, are associated with the interval. In FM, on the contrary, when A0 and B0=11 and 01, nominal durations of 2 microseconds and 4 microseconds, respectively, are associated with the interval. In case of MFM recorded information recovery (FM/$\overline{\text{MFM}}$=0), the information present on outputs PR1-PR6 of memory 330 is indicative of the actual duration (corrected as to speed) of interval N in coded form, as well as the noiminal duration associated with it and the nominal duration of the previous interval (N−1). All these pieces of information are expressed by one 6-bit code which is able to represent all the reasonable possible combinations of them. In fact, only a certain range of possible actual durations corresponds to a nominal duration of interval N. However, for the sake of clarity, it is better to consider such pieces of information as distinct and indicated respectively by $DE_N$ (actual duration of interval N), $DN_N$ (nominal duration of interval N) and $DN_{N-1}$ (nominal duration of interval N−1). In case of FM recorded information recovery (FM/$\overline{\text{MFM}}$=1), the information present on outputs PR1-PR6 of memory 330 may be not significant.

Outputs A0, B0 and PR1-PR6 of memory 330 are connected to corresponding inputs of register 331, which latches and makes the information present at its inputs available on its outputs on the rising edge of signal LOAD OUT. Outputs A1 and A2 of register 331 (corresponding to outputs A0 and B0 of memory 330) are connected to unit 40 of FIG. 2 through channel 33A, while outputs FB1-FB6 (corresponding to outputs PR1-PR6 of memory 330) are connected to the address inputs I6-I10 of the same unit 40. The operation of compensation unit 33 is as follows. At an indefinite instant preceding signal LOAD OUT, memory 330 receives input information $DE_N$, as well as information, $DE_{N-1}$, $DN_{N-1}$ and $DN_{N-2}$ (in case of MFM) or non-significant information (in case of FM) as feedback from the outputs of register 331. Code $DN_{N-1}$ will be present at outputs A1 and B1 of register 331. The so-addressed memory 330 generates the following set of information at its outputs:

outputs A0 and B0=code $DN_N$
outputs PR1-PR6=$DE_N$, $DN_N$ and $DN_{N-1}$ (in case of MFM), non-significant information (in case of FM).

These pieces of information are loaded into register 331 on the rising edge of signal LOAD OUT. The nominal duration $DN_N$ of interval N is therefore available and it is used by unit 40 for generating timing window signal RD CLK and for regenerating the read pulses RD DATA. Further, the several pieces of information present on outputs FB1-FB6 of register 331 are used for readdressing memory 330 and for establishing the nominal duration $DN_{N+1}$ of the subsequent interval N+1.

At the beginning, since there is not any previously recorded data, memory 330 can associate with a code $DE_N$ (where N=1, 2, 3, etc.) a wrong code of nominal duration $DN_N$. Such code when processed by unit 40, can cause a wrong generation of signals RD DATA and RD CLOCK (window). This does not cause any problem, since controller 3 (FIG. 1) ignores these signals until it detects a suitable number of synchronization field bytes (i.e., 2 bytes of 0's in FM or 4 bytes of 1's or 0's in MFM) and a preestablished code named "Address Mark" within a preestablished number of bytes. The actual length DE of an activation field interval, corrected as to possible speed error, coincides (except for the first and the last interval) with the nominal duration DN.

Thus, when a synchronization field is read out, memory 330 generates at its outputs PR1-PR6, one of the allowable codes corresponding to the measured interval DE which is equal to the nominal interval DN. During the reading out of two subsequent intervals, the code generated at outputs PR1-PR6 is unequivocally established. Thus, the acknowledgement of a first part of the synchronization field allows presetting of the speed correction unit 32 and the immediately subsequent acknowledgement of the other two synchronization field intervals enables compensation unit 33 to lock effectively to the data stream.

It will be now explained, in the case of MFM recorded information, how by knowing $DN_{N-2}$, $DN_{N-1}$ and $DE_{N-1}$ allows unequivocally the association of an actual length $DE_N$, to its nominal duration $DN_N$. Considering an interval N between pulses n−1 and n, the difference $E_N$ between actual length and nominal length of such interval is given by $E_N = DE_N - DN_N = PS_{n-1} + PS_n$ where $PS_{n-1}$ and $PS_n$ is the peak shift of pulses n−1 and n, respectively. $E_N$ has a maximum absolute value when both intervals N−1 and N+1 have a nominal length of 2 microseconds while interval N has a nominal length of 4 microseconds, or when intervals N+1 and N−1 have a nominal length of 4 microseconds, while interval N has a nominal length of 2 microseconds. Considering that a magnetic medium is a passive element, the effect cannot exceed the cause. That is, $E_N$ must not be such as to generate an interval N of a longer actual duration (if $DN_N=2$ microseconds) or shorter (if $DN_N=4$ microseconds) than the actual length $DN_{N-1}$ and $DN_{N+1}$. This means that each pulse peak shift cannot be longer than 500 nanoseconds, as absolute value.

According to the above considerations, it is easy to conclude that:

$2000 \leq DE_N \leq 3000$ when $DN_N = 2$ microseconds
$2333 \leq DE_N \leq 3666$ when $DN_N = 3$ microseconds
$3000 \leq DE_N \leq 4000$ when $DN_N = 4$ microseconds.

In FM, it is easy to discriminate among the intervals having nominal durations of 2 microseconds, according to the actual duration only. On the contrary, in MFM, a substantial amount of indetermination exists among the intervals of nominal durations 2 and 3 microseconds and 3 and 4 microseconds. Such indetermination can be overcome if $PS_{n-1}$ is known; that is, the pulse n−1 peak shift defining the end of interval N=1 and the beginning of interval N. In fact, when $PS_{n-1}$ is known, $DN_N = (DE_N - PS_{n-1}) - PS_n$ is known apart from a variable factor $PS_n$ shorter (in absolute value) than 500 nanoseconds, and the association of $DN_N$ with a nominal length of 2, 3 or 4 microseconds is unmistakable. It is further known that the pulse peak shift varies according to the interval nominal duration which precedes or follows it so that:

$PS_{n-1} = F(DN_N, DN_{N-1})$.

The function F, though difficult to express analytically, can be experimentally defined. In the case of $PS_{n-1}$, such relation cannot be used because $DN_N$ is not known. But it can be used to define $PS_{n-2} = F(DN_{N-1}, DN_{N-2})$ and as $DN_{N-1} = DE_{N-1} - (PS_{n-2} + PS_{n-1})$. The result is that $PS_{n-1} = DE_{N-1} - DN_{N-1} - F(DN_{N-1}, DN_{N-2})$. In other words, $PS_{n-1} = F_1 (DE_{N-1}, DN_{N-1}, DN_{N-2})$ where $F_1$ is a functional relationship which can be defined experimentally even if it is not easily expressed analytically. Therefore, $DN_N = DE_N - F_1(DE_{N-1}, DN_{N-1}, DN_{N-2}) - PS_n$ is obtained; that is, $DN_N = F_2(DE_N, DE_{N-1}, DN_{N-1}, DN_{N-2}) - PS_n$. The functional relationship $F_2$ is processed by memory 330.

Figure 8:
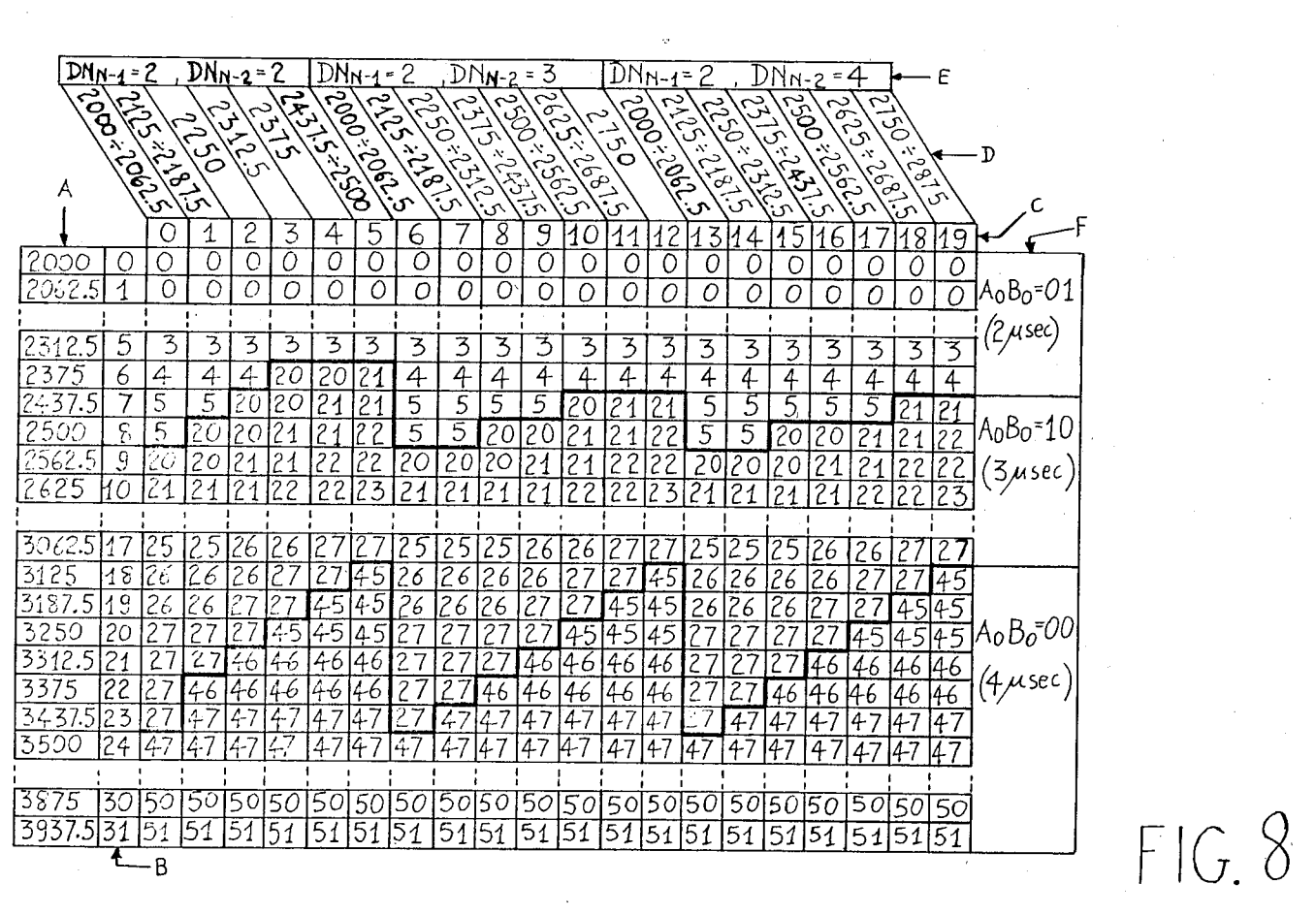
Figure 9:
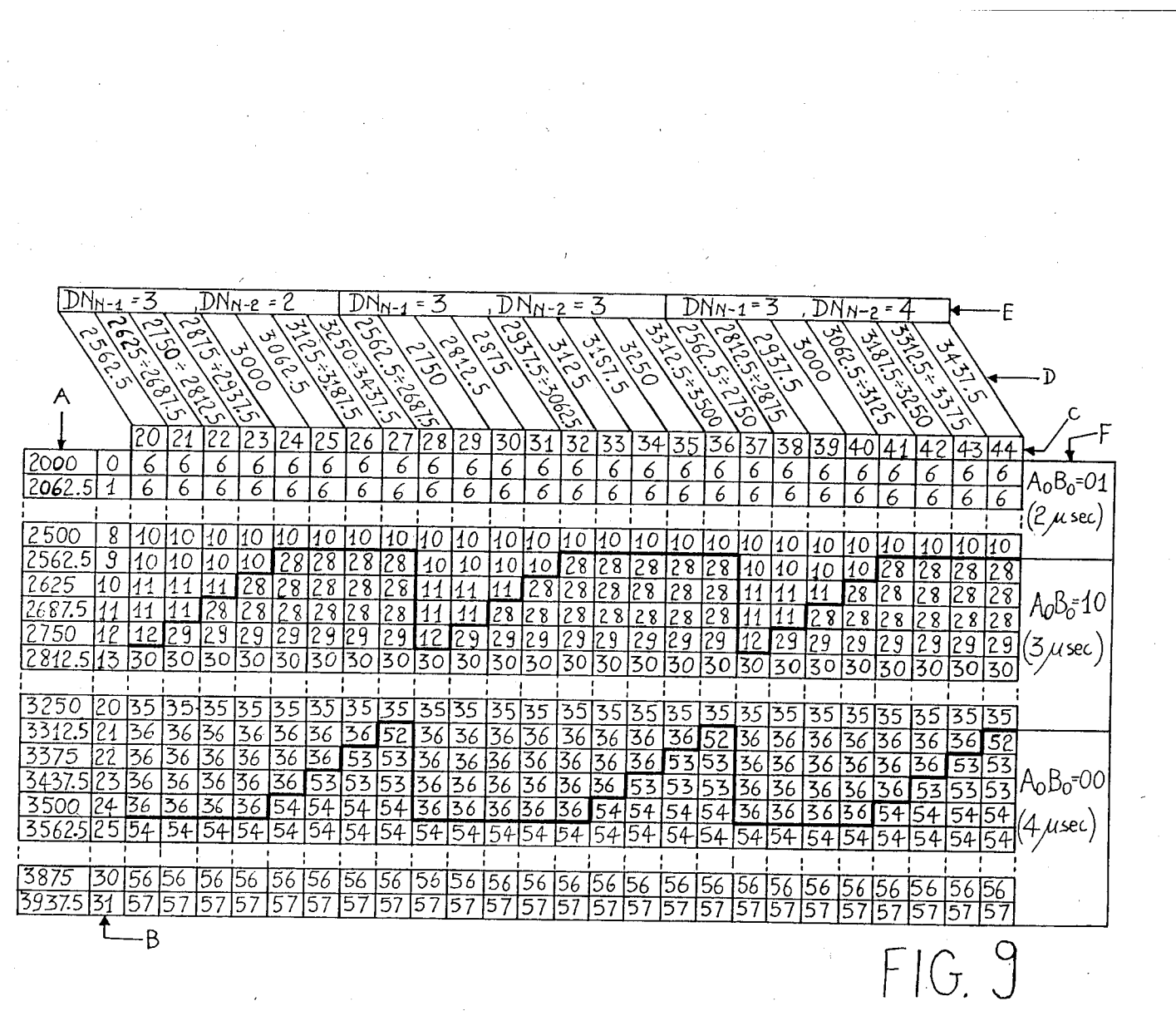
Figure 10:
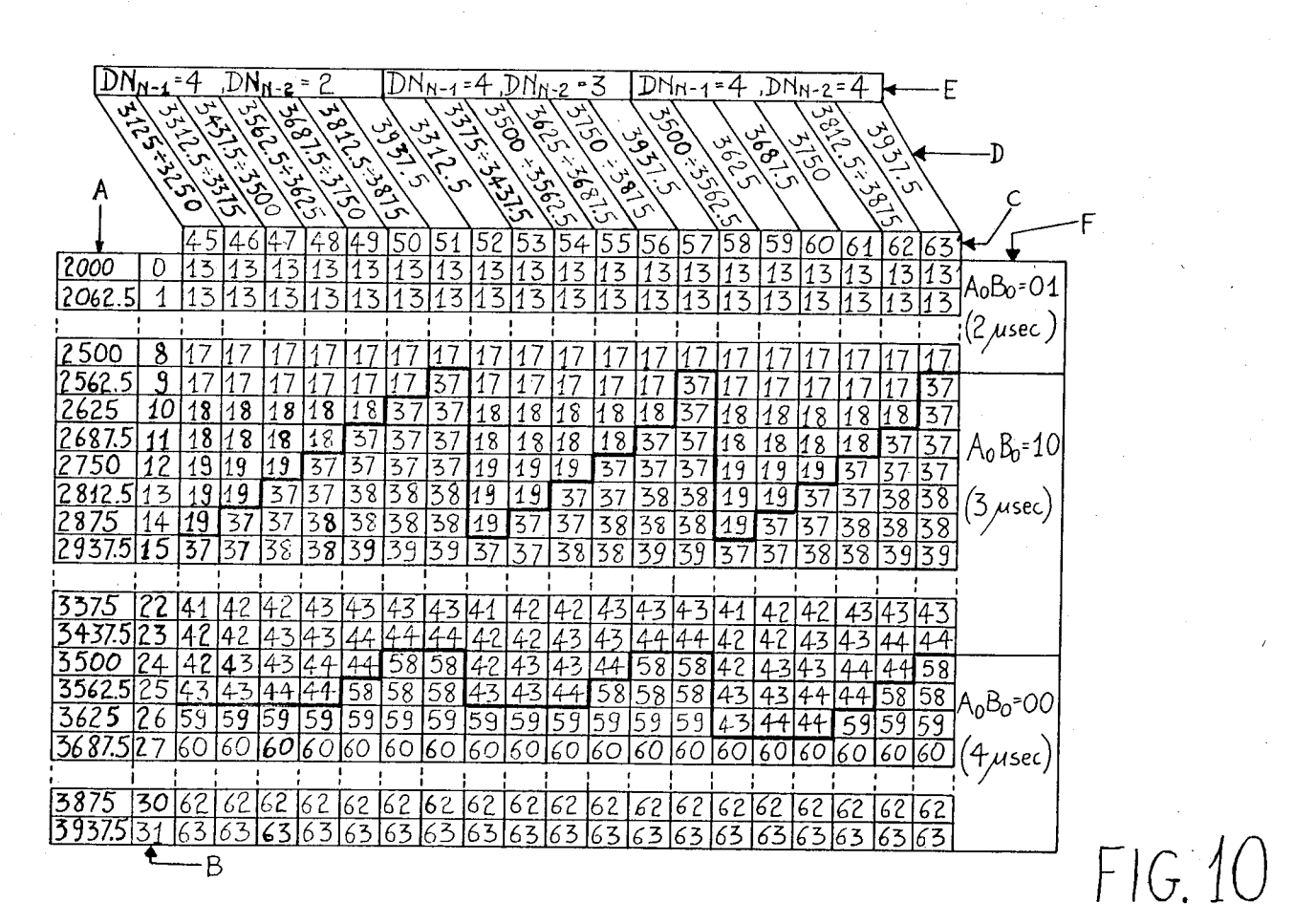

According to the above considerations and experimental verification within each location of a zone of memory 330 used in MFM, a code A0B0 is stored which defines the nominal duration to be associated with the actual duration code (SR1-SR5) depending on code (FB1-FB6) and an additional code which substantially gives a measurement indicative of the peak shift to be recovered on the subsequent actual duration measurement. FIGS. 8, 9 and 10 show in a partial but meaningful way, the zone mapping of memory 330 used in the case of MFM recording. A description of memory 330 zone mapping, used in the case of FM recording is omitted since it is obvious.

In FIGS. 8, 9 and 10, the content of memory 330 is shown in a 32-row and 64-column matrix which identifies 2048 memory locations. Conceptually, each location is identified by a row address and a column address. The row address, shown as column B in decimal, is indicative of the duration $DE_N$ of an interval in coded form. The interval duration $DE_N$ is given in column A. The column address, shown in decimal form in row C, is indicative (in coded form) of the set of information given by the actual duration $DE_{N-1}$ and by the nominal durations $DN_{N-1}$ and $DN_{N-2}$. The actual duration of each interval N−1, associated with each one of the column codes, is given in row D. The different combination of durations $DN_{N-1}$ and $DN_{N-2}$ associated with each set of column codes is given in row E. In each location, a code indicative of $DE_N$, $DN_N$ and $DN_{N-1}$ is given in decimal form. The actual value of each one of such pieces of information is the same as that associated with the column codes, except that the intervals to which such information refer are those of order N and N−1 instead of N−1 and N−2.

Two scored lines cut the memory matrix into 3 fields, each one containing all of the memory locations which include besides the already mentioned codes, a code of nominal duration $DN_N = 2$ microseconds, 3 microseconds or 4 microseconds, respectively. Such code is available at outputs A0, B0 of memory 330 and is given in column F. In FIGS. 8 and 10, it is to be noted that in the case the measured duration, $DE_N$ (column A) is to be associated with $DN_N = 3$ microseconds and such interval N is preceded by an interval N−1 with $DN_{N-1} = 2$ or 4 microseconds. There is no correspondence between the measured $DE_N$ and the $DE_N$ indicated by the code used to define $DN_{N+1}$, but such code is indicative of a $DE_N$ which is longer, equal or shorter than the actual one, experimentally adjusted for consideration of the following two factors:

(1) Taking account of the intrinsic indetermination error in the discrete measurement of $DE_N$, in the suitable correcting direction and in the case of higher marginal risk.

(2) Taking account of the second order of influence that pulse n−2 exercises on $PS_n$ and which is not considered by relationship $PS_n = F(DN_{N+1}, DN_N)$. The farther pulse n−2 is from pulse n, the less is such influence. In other words, value $PS_n$, established as the difference between $(DE_N - PS_{n-1})$ and $DN_N$, is affected by a certain round off error as the real value, and the longer the duration $DE_{N-1}$ is relative to $DN_{N-1}$, the higher is such error. The real value is implicitly applied to $PS_n$ by an increase in the correction of $DE_N$, and the longer the length $DE_N$ is, the higher the correction is applied.

Figure 11:
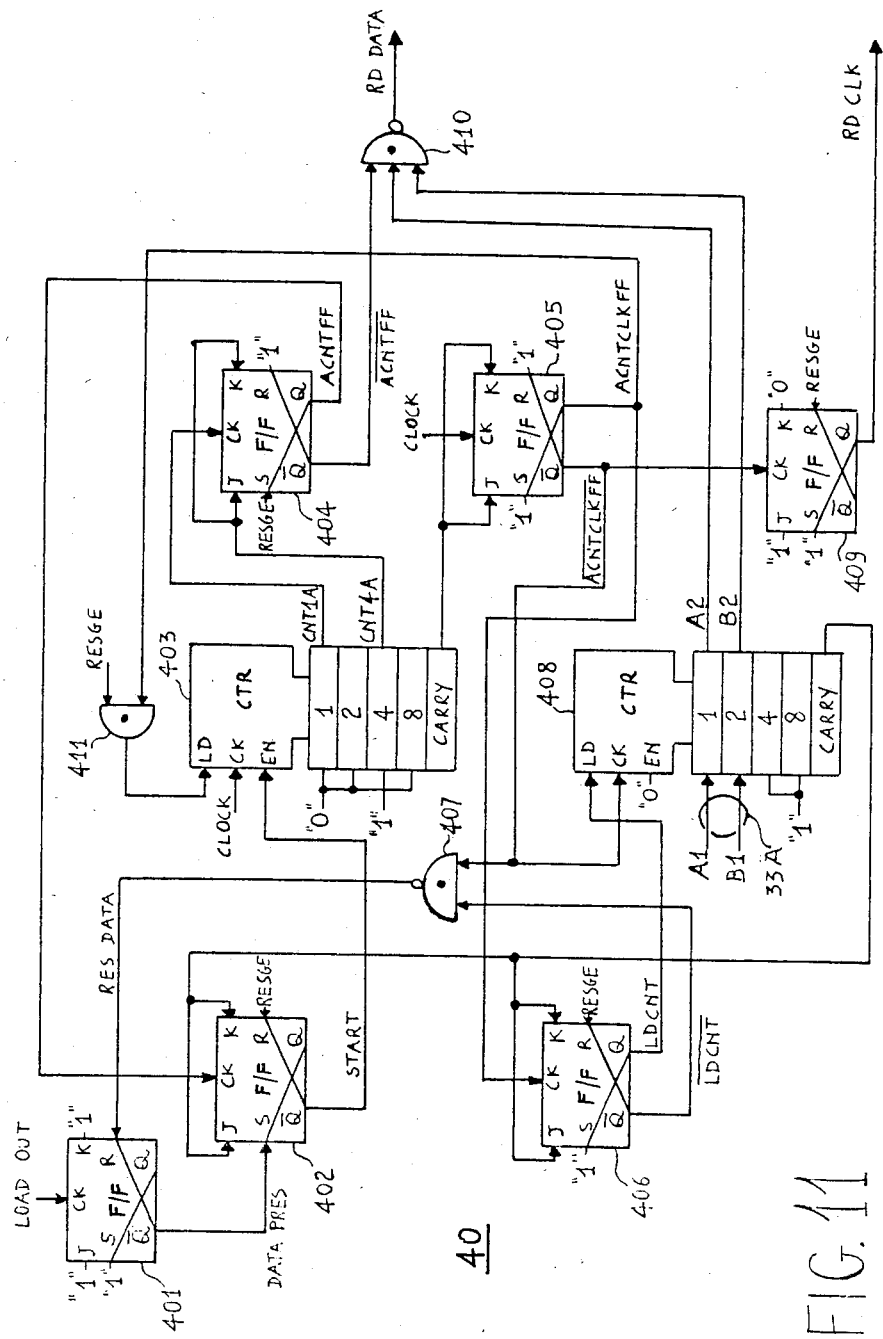
FIG. 11 shows in detail, the regenerating unit of the digital apparatus of FIG. 2.

FIG. 11 shows in detail, regeneration logical unit 40. Such unit generates the square wave window signal RD CLK and the read out data or timing pulse RD DATA according to signals A1 and B1 which define the nominal duration of the measured interval and of signal LOAD OUT. Such signal is generated by timing unit 20 upon the reception of each pulse RAW DATA after a delay of 120 nanoseconds rounded down to less than 62.5 nanoseconds. In FM, the RD CLK signal must consist of one or two half waves or phases, respectively, for each interval of nominal duration of 2 or 4 microseconds. Further, in FM, when the interval nominal duration is 2 or 4 microseconds, the pulse RD DATA must be completely included solely within the first or second phase of the window signal, respectively. On the contrary, in MFM, the window signal RD CLK must consist of two, three or four half waves or phases, respectively, for each interval of a nominal length of 2, 3 or 4 microseconds, and the pulse RD DATA must be completely included within the last phase of the window signal corresponding with the interval.

Unit 40 consists of six JK flip-flops 401, 402, 404, 405 and 409, two 4-bit counters 403 and 408, a two input AND gate 411, a two input NAND gate 407 and a three input NAND gate 410. Flip-flop 401 receives the signal LOAD OUT on its timing input CK and a signal RES DATA on its reset input R. A signal permanently at a logical 1 level is received on the remaining inputs of flip-flop 401. Signal DATA PRES is present at the inverted output $\bar{Q}$ of flip-flop 401. Signal DATA PRES drops to a logical 0 level on the rising edge of signal LOAD OUT. Signal DATA PRES rises to a logical 1 level when signal RES DATA falls to a logical 0 level.

Signal DATA PRES is applied to the set input of flip-flop 402 which receives on its timing input CK a signal ACNTFF and on its reset input R an initializing reset signal RESGE which is at a logical 0 level only during the initializing phase. The JK inputs of flip-flop 402 are connected to the CARRY output of counter 408. At the inverted output $\bar{Q}$ of flip-flop 402, a signal START is present which falls to a logical 0 level when signal DATA PRES falls to a logical 0 level and rises again to a logical 1 level on the rising edge of signal ACNTFF when the CARRY output of counter 408 is at a logical 0 level and if signal DATA PRES has risen again to a logical 1 level.

Signal START is applied to the enabling EN of counter 403 which receives signal CLOCK on its clock input CK. The loading input LD of counter 403 is connected to the output of AND gate 411. Such gate receives at its two inputs, signal RESGE and a signal ACNTCLKFF, respectively. Each of the data inputs of counter 403 receives a suitable level signal in order that counter 403 is preset at the decimal count of 4 on the rising edge of signal CLOCK when input LD is at a logical 0 level. When signal START falls to a logical 0 level, counter 403 increments the information present on its outputs by one on each rising edge of signal CLOCK.

Outputs CNT1A and CNT4A of counter 403 are connected to the clock input CK and to the JK inputs of flip-flops 404. Such flip-flop further receives signal RESGE and a signal permanently at a logical 1 level on its set and reset inputs, respectively. Signals ACNTFF and $\overline{ACNTFF}$ are present on outputs Q and $\bar{Q}$, respectively, of flip-flop 404. As already mentioned, signal ACNTFF is applied to the timing input CK of flip-flop 402. The CARRY output of counter 403 is connected to JK inputs of flip-flop 405 which further receives signal CLOCK on its clock input CK and a signal permanently at a logical 1 level on its set S and reset R inputs. Signals ACNTCLKFF and $\overline{ACNTCLKFF}$ are present on outputs Q and $\bar{Q}$, respectively, of flip-flop 405.

Besides being provided to an input of AND gate 411, signal ACNTCLKFF is applied to the clock input CK of flip-flop 406 whose JK inputs are connected to the CARRY output of counter 408. Set and reset inputs of flip-flop 406 receive signal RESGE and a signal permanently at a logical 1 level, respectively. Signals LDCNT and $\overline{LDCNT}$ are preesent on outputs Q and $\bar{Q}$, respectively, of flip-flop 406.

Signal $\overline{LDCNT}$ is applied to an input of NAND gate 407 which receives signal $\overline{ACNTCLKFF}$ on its second input. Signal RES DATA is present on the output of NAND gate 407. As already mentioned, such signal is applied to the reset input of flip-flop 401. Besides being provided to the input of NAND gate 407, signal $\overline{ACNTCLKFF}$ is applied to the timing inputs of counter 408 and flip-flop 409. Flip-flop 409 receives on its JK inputs, a signal at a logical 1 and 0 level, respectively. Further, flip-flop 409 receives on its set and reset inputs, a signal at a logical 1 and 0 level, respectively. On the direct output Q of flip-flop 409, a signal RD CLK is present which changes state on each rising edge of signal $\overline{ACNTCLKFF}$.

Counter 408 receives signal LDCNT on its load input and a signal at a logical 0 level on its enable input EN. THe two least significant data inputs of counter 408 are connected to outputs A1 and B1 of register 331 of unit 33 of FIG. 7. On the contrary, the two most significant data inputs of counter 408 receive a signal permanently at a logical 1 level. Counter 408 transfers on its outputs, the information present at its data inputs in response to the rising edge of signal $\overline{ACNTCLKFF}$ when signal LDCNT is at a logical 0 level. Then, counter 408 increments by one the information present at its outputs, in response to the rising edge of signal $\overline{ACNTCLKFF}$ when signal LDCNT is at a logical 1 level. Outputs A2 and B2 of counter 408 are connected to two inputs of NAND gate 410 which receives signal $\overline{ACNTFF}$ on its third input. The operation of unit 40 can be easily understood by examining the timing diagram of FIG. 12 which shows some of the signals of FIG. 11 which start from an initial reset state. The sequence (OUT 403)$_H$ is indicative of counter 403 status in hexadecimal code. Flip-flop 401 is set upon receipt of the first pulse LOAD OUT at time t1. Therefore, signal DATA PRES falls to a 0 and sets flip-flop 402. Signal START falls to a 0 and enables counter 403 to count. When counter 403 reaches the count of 8, the output CNT4A falls to 0 and flip-flop 404 is reset (i.e., ACNTFF=0) on the following signal CLOCK.

When counter 403 reaches the count of C, the output CNT4A rises again to a 1 and flip-flop 404 is set (i.e., ACNTFF=1) on the following CLOCK signal. The rising edge of signal ACNTFF does not modify the state of flip-flop 402 because signal CARRY 408 from the output of counter 408 is at a logical 1 level. When counter 403 reaches the count of F, its output CARRY falls to a 0 (CARRY 403=0). Flip-flop 405 is therefore reset (ACNTCLKFF=0 and $\overline{ACNTCLKFF}$=1) by the next signal CLOCK at time t2. Counter 408 is enabled for loading (LDCNT=0) on the rising edge of signal $\overline{ACNTCLKFF}$.

The binary information which defines the nominal duration of the measured interval preceding the pulse RAW DATA (which generated pulse LOAD OUT) is available at outputs A2 and B2. Precisely, in MFM:

A2=0 and B2=1 when the nominal length is 2 microseconds.

A2=1 and B2=0 when the nominal length is 3 microseconds.

A2=0 and B2=0 when the nominal length is 4 microseconds.

Figure 12:
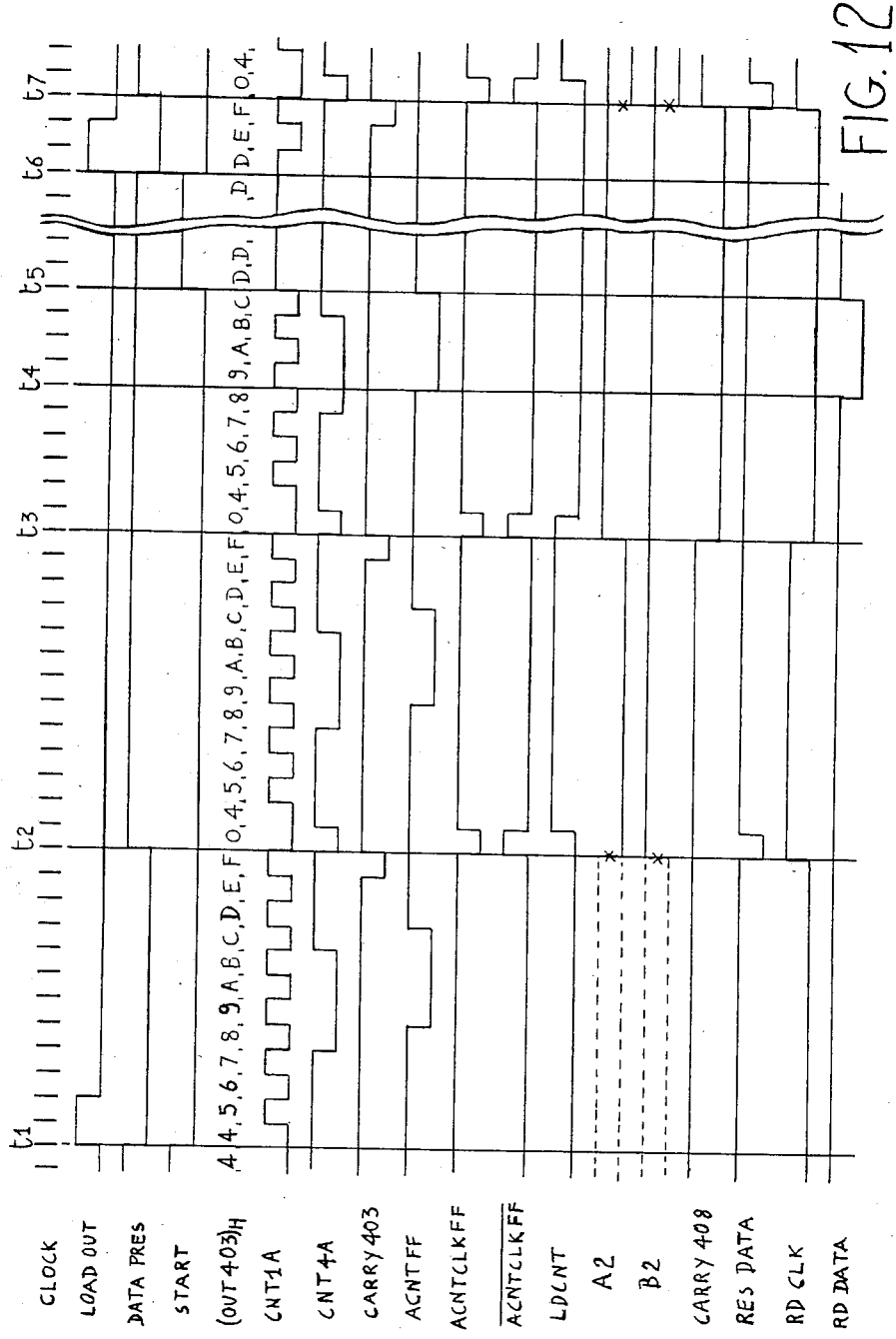
FIG. 12 is a timing diagram associated with FIG. 11.

The case where A2=0 and B2=1 is shown in the diagram of FIG. 12.

Further, on the rising edge of $\overline{ACNTCLKFF}$, flip-flop 409 switches state and signal RDCLK rises to a 1 defining the beginning of the first phase of the interval associated with pulse LOAD OUT. At the same time, signal RES DATA falls to a 0 (i.e., $\overline{\text{ACNTCLKFF}}=1$ and $\overline{\text{LD CNT}}=1$), flip-flop 401 is reset, signal DATA PRES rises to a 1, counter 403 reaches the count of 0 and signal CARRY 403 rises to a 1 while CNT4A falls to a 0. Again, upon the next CLOCK signal, counter 403 is set at the count of 4 (i.e., ACNTCLKFF=0), flip-flop 404 stays set while flip-flops 405 and 406 are set. Again, signal RES DATA rises to a 1. Then, when counter 403 reaches the count of 8, CNT4A falls to a 0 and flip-flop 404 is reset by the subsequent rising edge of signal CLOCK. When counter 403 reaches the count of C, CNT4A rises again to a 1. Flip-flop 404 is set again by the subsequent CLOCK signal. The rising edge of signal ACNTFF does not modify the set state of flip-flop 402 because signal CARRY 408=1. When counter 403 reaches the count of F, signal CARRY 403 falls to a 0.

Upon the next CLOCK signal (i.e., time t3), the following events occur:

(1) Flip-flop 405 is reset (ACNTCLKFF=0 and $\overline{\text{ACNTCLKFF}}=1$).

(2) Flip-flop 409 toggles and signal RD CLK falls to a 0.

(3) Counter 408 increments by one and in the case where A2=0 and B2=1, the count of F is reached and signal CARRY 408 falls to a 0.

(4) Counter 403 is set to the count of 0 and signal CARRY 403 rises to a 1.

At time t3, upon the subsequent CLOCK signal, counter 403 is set to the count of 4 and flip-flop 405 is set. The rising edge of signal ACNTCLKFF causes the resetting of flip-flop 406 and signal LD CNT falls to a 0. When counter 403 reaches the count of 8, flip-flop 404 is reset and signal $\overline{\text{ACNTFF}}$ rises to 1 (i.e., at time t4). At this point, when A2=1 and B2=1, signal RD DATA falls to a 0 and it stays at 0 until flip-flop 404 is again set at time t5. At this time, flip-flop 402 too is reset because signal CARRY 408=0. START signal is at 1 and counter 403 is therefore stopped at a count of D. Correspondingly, unit 40 is kept in the defined state status until a new pulse LOAD OUT is received.

FIG. 12 shows that such pulse is received at time t6. Flip-flop 401 is set at the reception of signal LOAD OUT and signal DATA PRES falls to a 0. Flip-flop 402 is set and signal START falls to a 0. Counter 403 starts to increment, this time starting from the count of D. When it reaches a count of F, (time t7), flip-flop 405 is reset and signal ACNTCLKFF falls to a 0 while $\overline{\text{ACNTCLKFF}}$ rises to a 1. Thus, at time t7, signal RD CLK switches state and signal RES DATA falls to a 0. Also, counter 408 is loaded with new information for a nominal duration relative to the new received pulse LOAD OUT and signal CARRY 408 rises again to a 1. With the subsequent CLOCK signal, flip-flop 406 is set and all the previously described events subsequent to time t2 occur in sequence.

FIG. 12 shows the case where the information A1=0 and B1=0 are received from register 408, that is, a nominal interval having a duration of 2 microseconds. In the case where A1=1 and B1=0, that is, for a nominal interval of 3 microseconds, it is easy to verify that at time t3, signal CARRY 408 stays at a 1 and, upon the subsequent CLOCK signal, flip-flop 406 is kept set and signal LD CNT remains at a 1. Therefore, a sequence of events follows time t3 which is the same as the one described for time interval t2, except that for time t3 signal RES DATA does not change. Such sequence is then followed by the sequence of events mentioned with reference to intervals t3, t4 and so on. Also, in the case where A1=0 and B1=0, that is, for a nominal interval of 4 microseconds at time t3, signal CARRY 408 remains at a 1 and time t3 is followed by two sequences of events identified to the ones described for times t2 and t3, except that signal RES DATA does not change. At the end of each sequence, a toggling of signal RD CLK occurs.

In conclusion, bearing in mind that the CLOCK period is of 62.5 nanoseconds, unit 40 operation is as follows. Unit 40 is enabled by a pulse LOAD OUT. After 187.5 nanoseconds (i.e., 3×62.5) from the reception of pulse LOAD OUT, except when signal LOAD OUT is the first received signal, unit 40 toggles. Phase signal RD CLK loads counter 408 and activates a first sequence having a length of 812.8 nanoseconds (13×62.5). This first sequence is performed 1, 2 or 3 times depending on the nominal duration value loaded in counter 408, which may be 2, 3 or 4 microseconds, respectively. In any case, signal RD CLK toggles at the beginning of the sequence. In other words, 1, 2 and 3 window signal phases are generated.

Once the preestablished number of first sequences is performed, a second sequence is activated having a length which varies according to the reception of a new pulse LOAD OUT and is not shorter than 812.5 nanoseconds (13×62.5). At the beginning of this second sequence, signal RD CLK toggles and a new window signal phase is generated. Further, during such phase, a signal RD DATA=0 is generated which starts with a delay of 6×62.5=374.5 nanoseconds from the beginning of the phase and that ends with a delay of 10×62.5=625 nanoseconds from the beginning of the phase. Such signal RD DATA is always within the corresponding phase.

FIG. 12 shows the case where pulses LOAD OUT are received when unit 40 is not active. Actually, pulse LOAD OUT may be received when the unit is still active. For instance, this may occur when, in MFM, a nominal interval of 4 or 3 microseconds is followed by a nominal interval of 2 microseconds. Unit 40 also correctly operates, in this case, without information loss, if the speed error is within the range of ±12.5%. For instance, let us suppose that a nominal interval of 4 microseconds is followed by two nominal intervals of 2 microseconds and each are detected in sequence.

Pulse LOAD OUT, corresponding to the nominal interval of 4 microseconds, is therefore followed by a second pulse LOAD OUT, corresponding to the nominal interval of 2 microseconds after a time interval greater than 2000−12.5%=1750 nanoseconds, and by a third pulse LOAD OUT after a time interval longer than 3500 nanoseconds. The second pulse is therefore received during the repetition of the first sequence, and flip-flop 401 is already reset. At the reception of the second pulse LOAD OUT, flip-flop 401 is set again. At time t5 of the second sequence (FIG. 12), unit 40, instead of stopping, goes on to complete the second sequence. Flip-flop 401 is reset again once 4×812.5+3×62.5=3500 nanoseconds have elapsed, that is, before the third pulse LOAD OUT is received. Therefore, the third LOAD OUT pulse can be detected.

In order to increase the range of operation of unit 40, the phase length can be obviously reduced or a FIFO memory (First In, First Out) with a logical network can be substituted for flip-flop 401 for reading out the information stored therein. It is clear that several other modifications can be made to digital phase lock apparatus without departing from the scope of the present invention. Particularly, in case FM recording, too, some codes can be recorded in memory 330 which are read out by outputs PR1-PR6 and which express in coded form the actual $DE_{N-1}$ and nominal $DN_{N-1}$ durations of interval N−1. This enables an increase in the discrimination margin for determining the nominal duration $DN_N$ of interval as a function of the previous interval duration.

The following list of circuits can be used in the preferred embodiment of the present invention:

1. The flip-flops 21, 23, 340, 341, 401, 402, 404, 405, 406 and 409 can be constructed integrated circuits having part number 74LS109A manufactured by Texas Instruments Inc.

2. The counters 22, 310, 311, 346, 347, 403 and 408 can be constructed from circuits having part number 74S169A manufactured by Texas Instruments Inc.

3. The shifting register 25 can be constructed from the circuits having part number 74LS195A manufactured by Texas Instruments Inc.

4. The latch registers 349 and 331 can be constructed from circuits having part number 74LS374 manufactured by Texas Instruments Inc.

5. The memories 320 and 330 can be constructed from circuits having part number 2732 manufactured by Fairchild Corp.

What is claimed is:

1. Digital apparatus for a data recovery system wherein data is recorded in FM or MPM code on magnetic media moving at a speed relative to a nominal speed and the reading of the magnetic media provides as an input to said apparatus, a sequence of timing/data pulses in which each of two subsequent data pulses identifies a variable time interval, said apparatus being clocked by clock pulses received from a clock pulse generator circuit and comprising:

timing and measurement means responsive to said clock pulses and to said timing/data pulses, for providing as outputs, after reception of each $n^{th}$ one of said timing/data pulses, a first code indicative of the actual duration of a time interval N between said timing/data pulse (n) and an immediately preceding one (n−1) of said timing/data pulses and an activation pulse delayed relative to said received $n^{th}$ one of said timing/data pulses;

logic means coupled to receive as an input, said first code from said timing and measurement means, said logic means supplying as an output, a first control signal at a first level when the actual duration of said interval N differs from a preestablished nominal duration by a preestablished amount;

speed error detection and storage means coupled to receive as an input, said first control signal and said activation pulse, said speed error detection and said storage means supplying as an output, a second code indicative of the speed error of said magnetic media relative to said nominal speed, said second code being updated by said speed error detection and storage means when said first control signal has been at said first level for a preestablished number of subsequent periods between activation pulses;

speed error correction means coupled to receive said first and second codes as inputs and said correction means supplying as an output, a third code indicative of the duration of said interval N corrected as to speed error of said media;

peak shift correction means including a memory having first and second sets of address inputs and first and second sets of outputs, said first set of address inputs being connected to receive said third code related to said N interval, said second set of address inputs being connected to receive a fourth code indicative of the nominal duration of a plurality of intervals immediately preceding said N interval during the recovery of data recorded in said MFM code, and the duration corrected as to speed of at least the immediately preceding interval N−1, said peak shift correction means in response to said third and fourth codes supplying on said first set of outputs, a fifth code indicative of a nominal duration associated with said N interval and on said second set of outputs, for at least the recovery of data recorded in said MFM code, a sixth code indicative of the nominal duration associated with said N interval and at least with the preceding interval N−1, as well as the duration corrected relative to the speed of said N interval;

latching means coupled to be clocked by said activation pulse received from said measurement means and being coupled to receive as an input, said sixth code before each activation pulse, said latching means being coupled to provide as an output, said sixth code as said fourth code to said second set of address inputs after being clocked by said activation pulse; and, window and signal generating means coupled to receive as an input, said fifth code, said window and signal generating means being triggered by said activation pulses to supply as an output, a window signal having a number of half cycles indicative of the nominal duration of the interval related to said fifth code, and a timing/data regenerated pulse having a desired phase relationship with the last half cycle of said window signal.

2. The digital apparatus of claim 1 wherein said logic means and said speed error correction means comprise a second memory connected to be addressed by said first and said second codes for delivering as an output, said first control signal and said third code.

3. The digital apparatus of claim 1 wherein speed error detection and storage means comprise:

period counting means in response to each activation pulse and to said first control signal providing as an output, a second control signal at a first level for indicating when said first control signal has switched to said first level or when said first control signal has remained at said first level for said preestablished number of subsequent periods between activation pulses;

a period duration counter connected to be set to a preestablished count by said second control signal when at a first level, said counter being incremented upon reception of said clock pulses; and, a register having an output and inputs connected to said period duration counter, said register being enabled by said second control signal when at a first level indicating that said first control signal has remained at said first level for said preestablished number of subsequent periods, to latch the most significant portion of the count reached by said period duration counter for providing said most significant portion at said output as said second code.

4. The digital apparatus of claim 3 wherein said preestablished number of subsequent periods is $2^P$ wherein P is an integer.

* * * * *